J. SELBY.
Corn-Planter.
No. 216,295. Patented June 10, 1879.
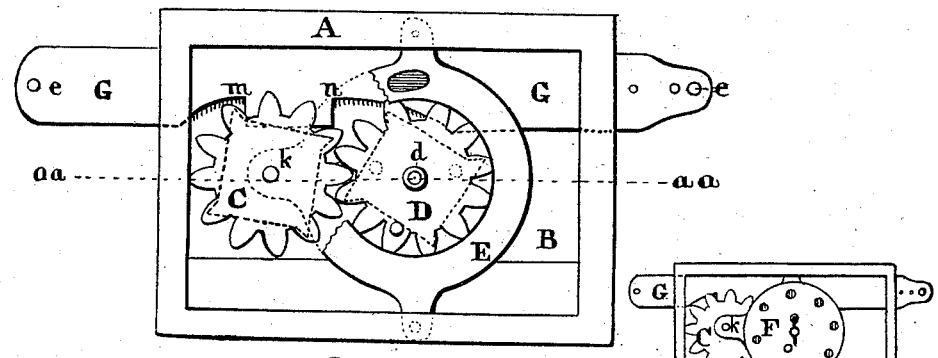
Fig. 1.
Fig. 2.
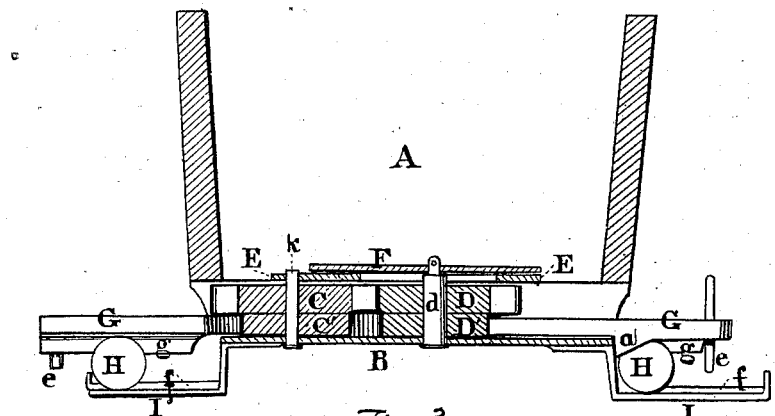
Fig. 3.
(Sec. Thro "aa" fig. 1).
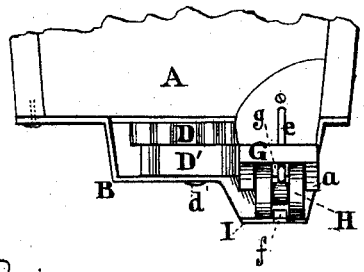
Fig. 4.
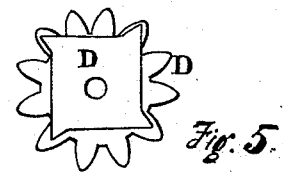
Fig. 5.
Witnesses
Lyndhurst Thurlow
Theo. Parrow
Inventor:
James Selby
by E. Thurlow atty in fact

UNITED STATES PATENT OFFICE.

JAMES SELBY, OF PEORIA, ILLINOIS.

IMPROVEMENT IN CORN-PLANTERS.

Specification forming part of Letters Patent No. 216,295, dated June 10, 1879; application filed July 1, 1878.

*To all whom it may concern:*

Be it known that I, JAMES SELBY, of the city of Peoria, in the county of Peoria, in the State of Illinois, have invented an Improvement in Motive Mechanism for Rotary Droppers for Corn-Planters, &c.; and do hereby declare that the following is a full, clear, and exact description thereof, reference being had to the annexed drawings, making a part of this specification, in which like letters of reference refer to like parts, and in which—

Figure 1 represents a superficial view, with the plates and box-floor removed to exhibit the improvement; Fig. 2, a superficial view of seed-box on a smaller scale, having the seed-plate over the motive wheels; Fig. 3, longitudinal vertical section through the center of seed-box, on line $a\, a$, Fig. 1; Fig. 4, an end view of seed-box; Fig. 5, an inferior view of one of the wheels, with its quadrilateral dog or pinion below it.

My invention relates to certain improvements in that class of rotary droppers actuated by the oscillating dropper-bar, in which two wheels engaged together receive intermittent or alternate motion (rotary) from dogs or pawls on said sliding bar, one or each of said wheels carrying on its shaft or axle a seed cup or plate for dropping seed; and consists in the use of a tooth upon the edge of said sliding bar instead of pawls; also, in concentrating all the work of seed-dropping in one wheel or seed-cup, if necessary or desirable; also, in using a friction-roller beneath each end of the sliding bar, or under that portion of same on the outside of either end of the seed-box.

The following is a general description: The bar, or extensions thereof into each seed-box, runs upon friction-rollers at either end of said box, and has near its middle part in said box a spur or tooth, which at each longitudinal vibration of said bar strikes alternately dogs or pins on the circumference of two horizontal wheels or pinions engaged with each other by means of teeth. Upon one of said wheels is a perforated horizontal plate for seed, and above this a rotary seed-plate with marginal seed-apertures (corresponding with said inferior perforation) fixed to the wheel and concentric therewith.

The tooth in the vibrating bar acts alternately, as before said, upon one of the engaged wheels, each in turn imparting its received motion to the other, thus continuing their respective motions in their several directions at each impact of the tooth of the bar. The effect of this triple acting is to rotate the seed plate or plates a certain distance in one direction at each vibration of said bar, and, in connection with proper seed openings and discharges, to perform the necessary work of furnishing and dropping the proper quantity of seed, which mechanism may be applied in many ways, and which are not the subject or object of this invention, nor here shown.

In the drawings, A represents the seed-box; B, the metal bottom of same, on which the wheels are pivoted and along which the vibrating bar G works; C D, small mutually-engaged spur-wheels, pivoted horizontally in a line near the side of the vibrating bar G, in such a manner that the tooth $m\, n$ (or either side of said tooth alternately) shall strike one of the four-cornered dogs D′ C′, respectively placed below and attached to each wheel, and push, in vibrating to the left, the wheel C in the same direction, and in sliding to the right push the wheel D in the latter direction, the result being that the motion of each wheel is alternately imparted to the other by means of the dogs and the engagement of the wheels.

E is a fixed perforated plate immediately above the wheel D, on which is imposed the revolving feed-plate F, which revolves with the wheel D; G, the oscillating bar, which may be vibrated in any convenient manner longitudinally, resting at either end upon a separate friction-roller, H, each of which is confined to a short course by pins or lugs $e\, e$, and prevented from leaving the track by means of a rib, $g$, projecting from the lower surface of the bar G, and also by another rib, $f$, rising from the surface of the track or bracket I, an extension of the bottom plate, B, of the box A. H H are the rollers above mentioned, each grooved centrally to receive said ribs $e\, f$ above and below, each carrying one end of the bar G, thereby relieving the said bar and the bottom plate, B, of much friction and wear. A stopper, $a$, or similar device, limits the extent of the stroke of the bar G.

What I claim as my invention is—

1. The construction and arrangement of the slide G with rollers H H, tracks I I, and seed-wheels C D C′ D′, as described.

2. The construction and arrangement of the slide-rollers or loose rollers H H of the slide G, confined to their respective places and to oscillatory motion by means of ribs $g$ beneath the slide, and by a rib, $f$, upon the track or roller-bed I of the box A, as and for the purposes described.

3. The tracking-rollers H H, in combination with the respective ribs $g\,f\,g\,f$ of the slide G, and track or beds I I, substantially as and for the purposes described.

4. The combination, with the seed cups or wheels C D C′ D′ and seed-box A, of a slide toothed or notched, with rollers H H and tracks I I, substantially as and for the purposes described.

In testimony that I claim the foregoing improvement in corn-planters I have hereunto set my hand this 26th day of June, 1878.

JAMES SELBY.

Witnesses:
O. B. CHAMPNEY,
M. D. SPURCK.